US008719735B2

(12) United States Patent
Sakamoto et al.

(10) Patent No.: US 8,719,735 B2
(45) Date of Patent: May 6, 2014

(54) OPTIMIZING LITHOGRAPHIC MASK FOR MANUFACTURABILITY IN EFFICIENT MANNER

(75) Inventors: Masaharu Sakamoto, Yamato (JP); Alan E. Rosenbluth, Yorktown Heights, NY (US); Marc Alan Szeto-Millstone, Seattle, WA (US); Tadanobu Inoue, Yamato (JP); Kehan Tian, Hopewell Junction, NY (US); Andreas Waechter, Yorktown Heights, NY (US); Jonathan Lee, Yorktown Heights, NY (US); David Osmond Melville, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 13/183,070

(22) Filed: Jul. 14, 2011

(65) Prior Publication Data

US 2013/0019211 A1    Jan. 17, 2013

(51) Int. Cl.
*G06F 17/50* (2006.01)
(52) U.S. Cl.
USPC ............ 716/50; 716/51; 716/52; 716/53; 716/54; 716/55
(58) Field of Classification Search
USPC ............................................. 716/50–56
See application file for complete search history.

(56) References Cited

U.S. PATENT DOCUMENTS

| 6,563,566 | B2 | 5/2003 | Rosenbluth et al. |
| 7,057,709 | B2 | 6/2006 | Rosenbluth |
| 8,028,254 | B2 | 9/2011 | Inoue et al. |
| 2003/0208742 | A1 | 11/2003 | LaCour |
| 2005/0177810 | A1 | 8/2005 | Heng et al. |
| 2006/0085773 | A1 | 4/2006 | Zhang |
| 2006/0129966 | A1* | 6/2006 | Rodin et al. ............ 716/19 |
| 2007/0162887 | A1 | 7/2007 | Suh et al. |
| 2007/0266346 | A1 | 11/2007 | Wu |
| 2008/0059918 | A1 | 3/2008 | Bergeron et al. |
| 2010/0146465 | A1 | 6/2010 | Berkens et al. |
| 2012/0044470 | A1 | 2/2012 | Smilde et al. |

OTHER PUBLICATIONS

A.E. Rosenbluth et al., "Optimum mask and source patterns to print a given shape," Society of photo-optical instrumentation engineers, JM3, Apr. 2002.

A.E. Rosenbluth et al., "Method for forming arbitrary lithographic wavefronts using standard mask technology," IBM disclosure YOR8-2005-0697, Oct. 4, 2007.

(Continued)

*Primary Examiner* — Paul Dinh
(74) *Attorney, Agent, or Firm* — Vazken Alexanian

(57) ABSTRACT

Mask layout data of a lithographic mask includes polygons that each include horizontal and vertical edges. Each of a number of target edge pairs is defined by two edges of one or more of the polygons. A search box having a boundary coincident with a given edge of the edges of the polygons is specified. Whether the search box includes at least one edge of the edges of the polygons in addition to the given edge is determined. Where the search box includes at least one edge, at least one of the target edge pairs is specified as including the given edge and one of the at least one edge. For each target edge pair that has been specified, a manufacturability penalty value is determined. A dynamic manufacturability constraint table and a non-zero multiplier table are maintained.

20 Claims, 6 Drawing Sheets

(56) References Cited

OTHER PUBLICATIONS

A.E. Rosenbluth et al., "Gobal optimization of masks, including film stack design to restore TM contrast to high NA TCC's," Proceedings-SPIE The International Society for Optical Engineering, year 2007.

A.E. Rosenbluth et al., "A method for global optimization of lithographic source intensities under contingent requirements," IBM disclosure YOR8-2007-0556, May 14, 2007.

A.E. Rosenbluth et al., "Global optimization of the illumination distribution to maximize integrated process window," Procs. of SPIE, year 2006.

* cited by examiner

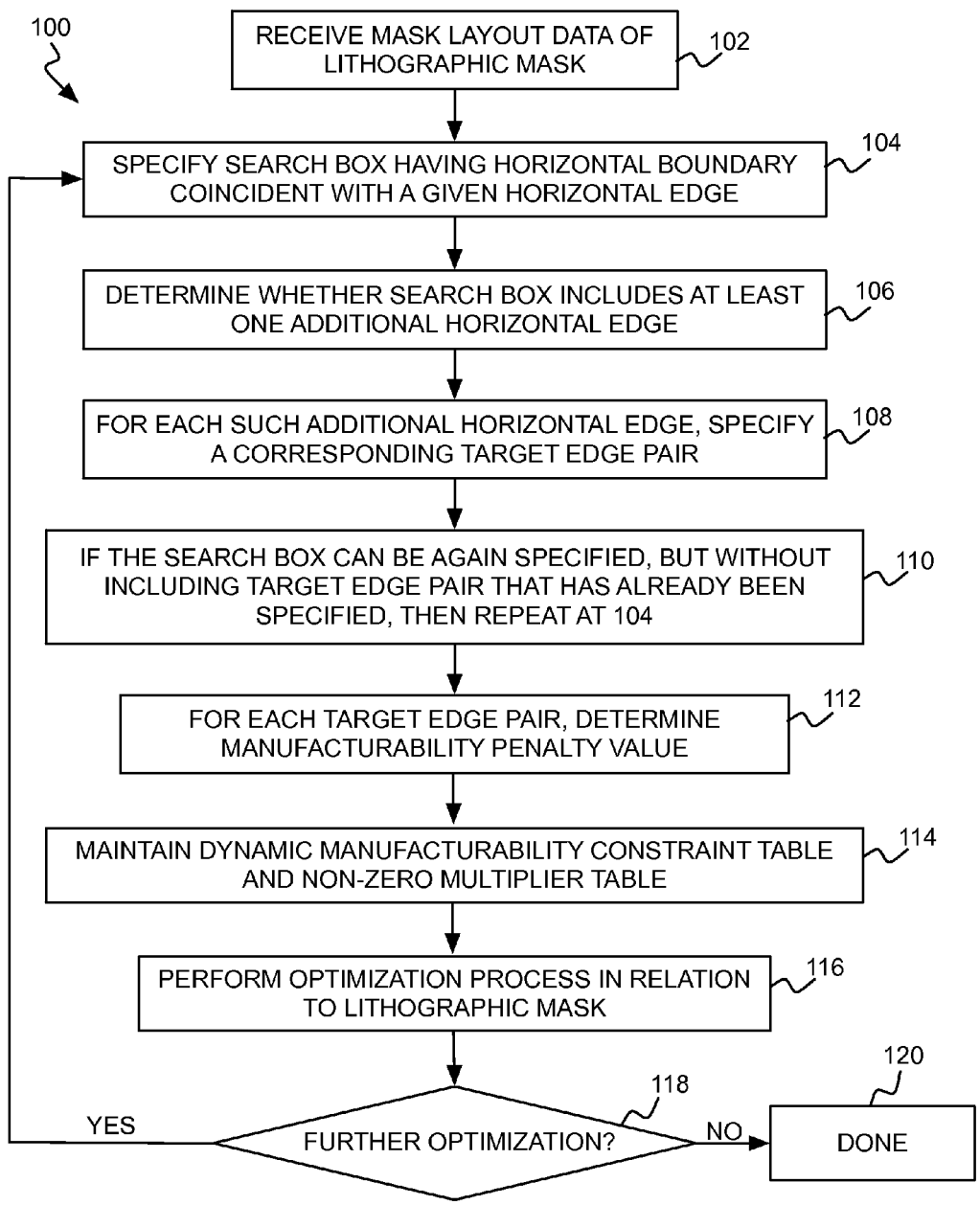

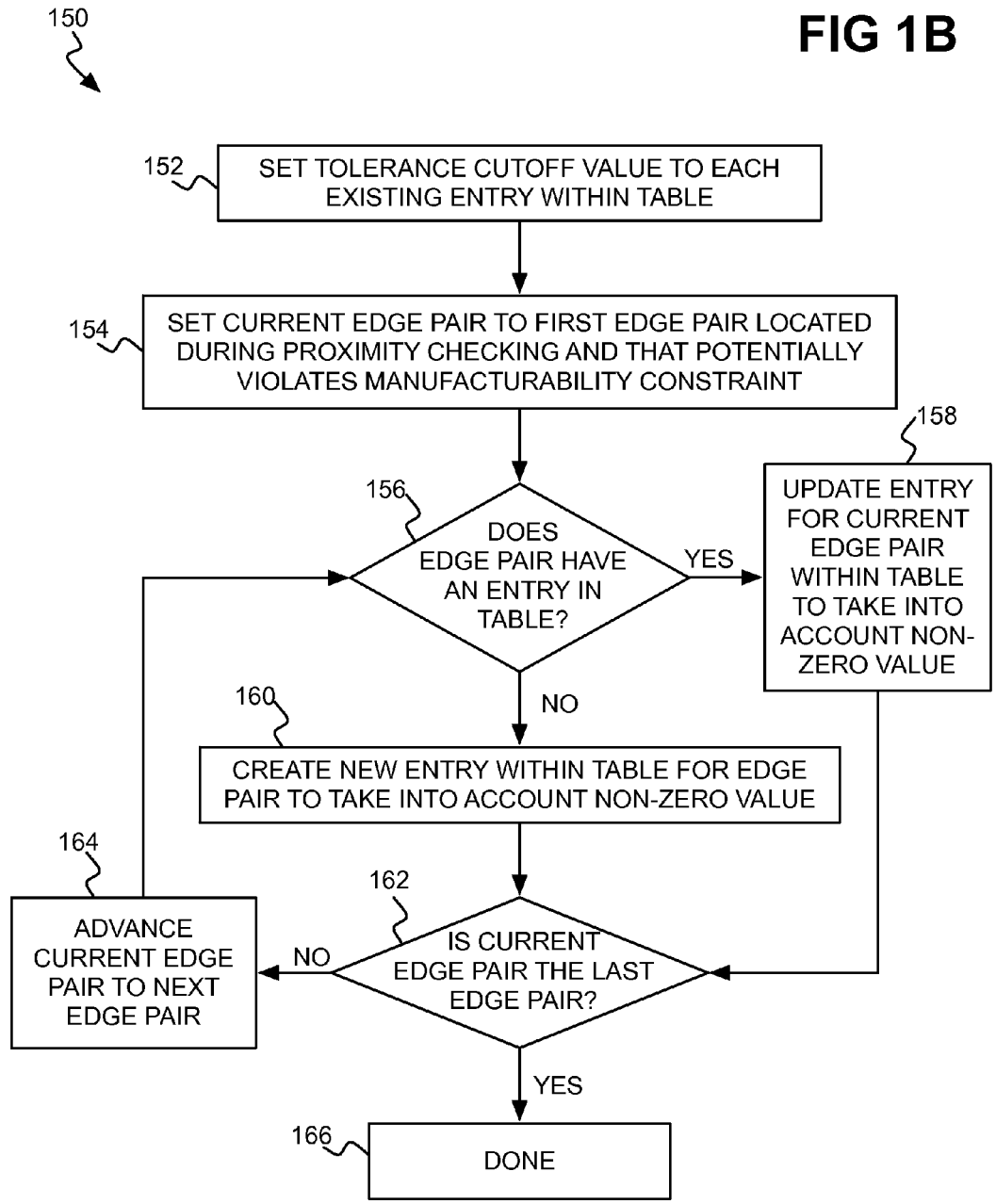

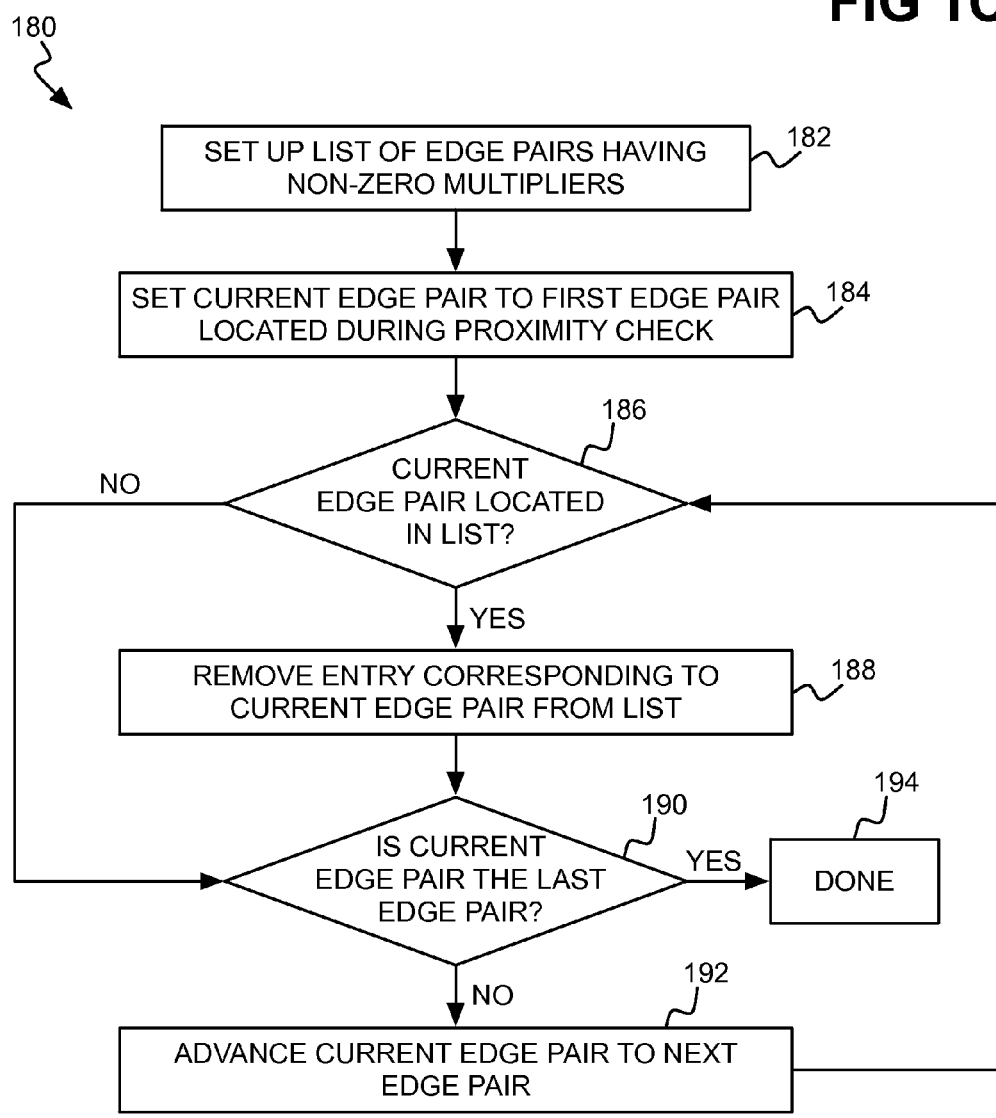

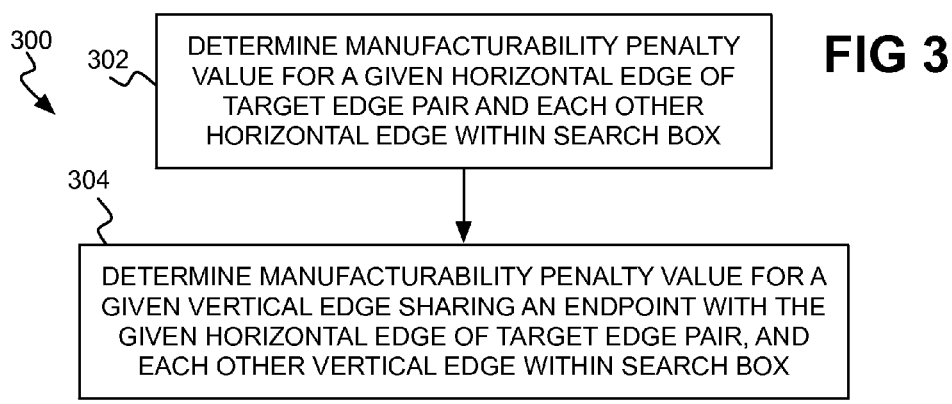
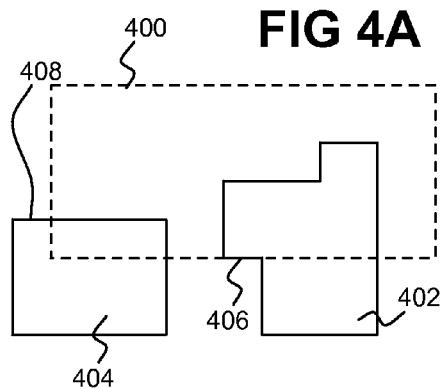
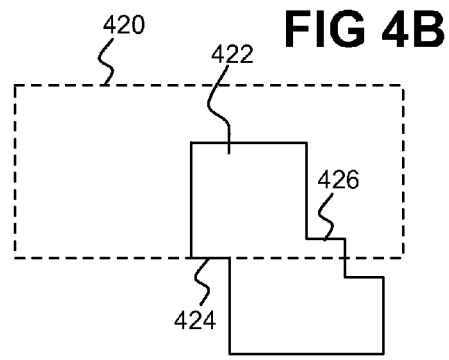
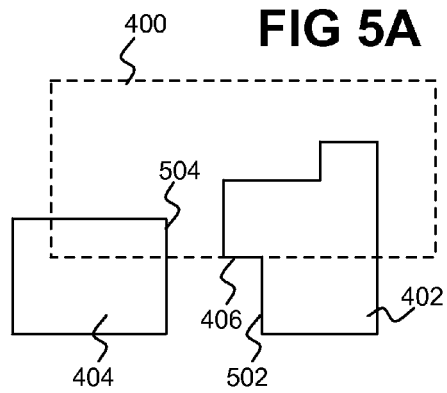
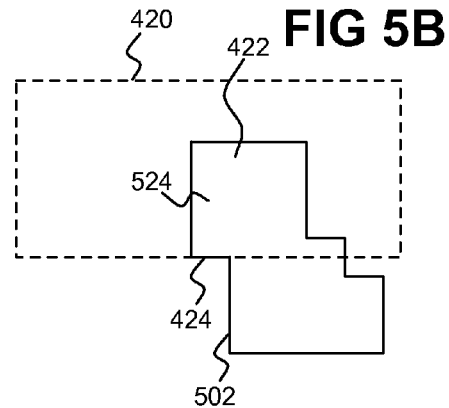

OPTIMIZING LITHOGRAPHIC MASK FOR MANUFACTURABILITY IN EFFICIENT MANNER

RELATED PATENT APPLICATIONS

The present patent application is related to the following patent applications, which are hereby incorporated by reference:

(1) The patent application entitled "determining manufacturability of lithographic mask by reducing target edge pairs used in determining a manufacturing penalty of the lithographic mask," filed on Dec. 14, 2008, and assigned Ser. No. 12/334,482;

(2) The patent application entitled "determining manufacturability of lithographic mask by selecting target edge pairs used in determining a manufacturing penalty of the lithographic mask," filed on Dec. 14, 2008, and assigned Ser. No. 12/334,485;

(3) The patent application entitled "determining manufacturability of lithographic mask using continuous derivatives characterizing the manufacturability on a continuous scale," filed on Dec. 14, 2008, and assigned Ser. No. 12/334,488; and, (4) The patent application entitled "determining manufacturability of lithographic mask based on manufacturing shape penalty of aspect ratio of edge that takes into account pair of connected edges of the edge," filed on Jan. 31, 2011, and assigned Ser. No. 13/017,593.

BACKGROUND

Semiconductor devices include semiconductor processors, semiconductor memories, such as static random-access memories (SRAM's), and other types of semiconductor devices. A common semiconductor device fabrication process is photolithography. In photolithography, a semiconductor surface is selectively exposed to light through a lithographic mask. The semiconductor surface is developed, and the areas that were exposed to light (or the areas that were not exposed to light) are removed.

Therefore, to employ photolithography in fabricating instances of a given semiconductor device, a lithographic mask first has to be manufactured. However, depending on various aspects of the semiconductor device, such as its complexity, the lithographic mask can be relatively difficult (if not impossible) to manufacture, or relatively easy to manufacture. As such, it can be important to assess the manufacturability of a lithographic mask before the mask is actually made.

SUMMARY

A method of an embodiment of the invention includes receiving, by a processor, mask layout data of a lithographic mask. The lithographic mask is employed in fabricating instances of a semiconductor device. The mask layout data includes polygons. Each polygon includes edges including horizontal edges and vertical edges. Each target edge pair of a number of target edge pairs is defined by two edges of one or more of the polygons. As an entry point of the method, the method includes specifying, by the processor, a search box having a boundary coincident with a given edge of the edges of the polygons. The method includes determining, by the processor, whether the search box includes at least one edge of the edges of the polygons in addition to the given edge. The method includes, where the search box includes the at least one edge, specifying, by the processor, at least one of the target edge pairs, where each target edge pair is specified as including the given edge and one of the at least one edge. Where the search box can again be specified, the method includes repeating the method at the entry point.

The method can further include, for each target edge pair that has been specified, determining a manufacturability penalty value, by the processor, for the target edge pair. The method can further include maintaining a dynamic manufacturability constraint table and a non-zero multiplier table, by the processor. The method can further include performing an optimization process in relation to the lithographic mask, and where further optimization is desired, needed, or requested, repeating the method at the entry point. The dynamic manufacturability constraint table and the non-zero multiplier table can be maintained as two separate tables, or as a single integrated table.

A computer-readable data storage medium of an embodiment of the invention has a computer program stored thereon. Execution of the computer program by a processor causes a method to be performed. The method includes receiving mask layout data of a lithographic mask. The lithographic mask is employed in fabricating instances of a semiconductor device. The mask layout data includes polygons. Each polygon includes edges including horizontal edges and vertical edges. Each target edge pair of a number of target edge pairs is defined by two edges of one or more of the polygons. As an entry point of the method, the method includes specifying a search box having a boundary coincident with a given edge of the edges of the polygons. The method includes determining whether the search box includes at least one edge of the edges of the polygons in addition to the given edge. The method includes, where the search box includes the at least one edge, specifying at least one of the target edge pairs, where each target edge pair is specified as including the given edge and one of the at least one edge. Where the search box can again be specified, the method includes repeating the method at the entry point.

A system of an embodiment of the invention includes a processor, and a computer-readable data storage medium that is to store mask layout data of a lithographic mask. The lithographic mask is employed in fabricating instances of a semiconductor device. The mask layout data includes polygons. Each polygon has edges, including horizontal edges and vertical edges. Each target edge pair of a number of target edge pairs is defined by two edges of one or more of the polygons. The system includes a computer program stored on the computer-readable data storage medium and executed by the processor. The computer program is to specify a search box having a boundary coincident with a given edge of the edges of the polygons. The computer program is to determine whether the search box includes at least one edge of the edges of the polygons in addition to the given edge. The computer program is to, where the search box includes the at least one edge specify at least one of the target edge pairs, each target edge pair specified including the given edge and one of the at least one edge.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 1A, 1B, and 1C are flowcharts of methods, according to varying embodiments of the invention.

FIG. 3 is a flowchart of a method for performing proximity checking, according to an embodiment of the invention.

FIGS. 4A and 4B are diagrams depicting proximity checking being performed in relation to horizontal edges, according to an embodiment of the invention.

FIGS. 5A and 5B are diagrams depicting proximity checking being performed in relation to vertical edges, according to an embodiment of the invention.

DETAILED DESCRIPTION

Figure 2:
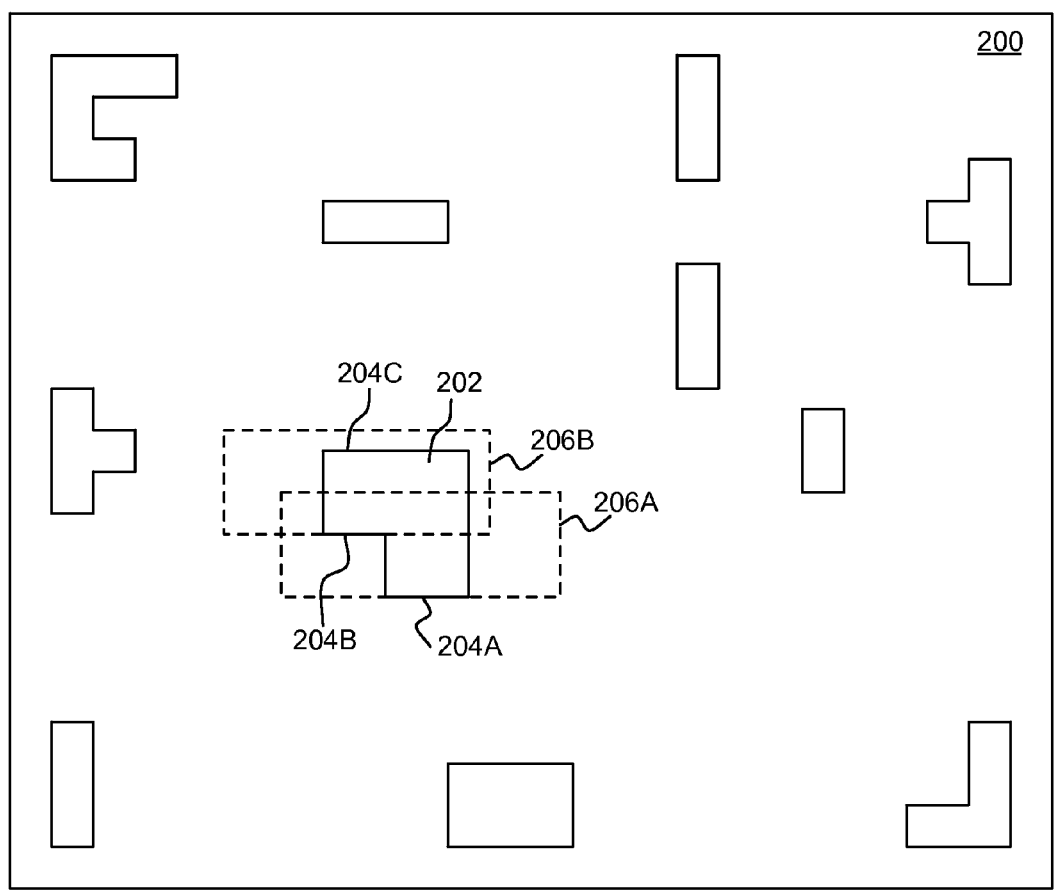
FIG. 2 is a diagram of example mask layout data, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, lithographic masks are employed to fabricate instances of semiconductor devices. There is increasing interest in lithographic optimization methods that attempt to optimally manage the fundamental resolution constraints imposed by state-of-the-art exposure tools. One such approach is known as source mask optimization (SMO). In SMO, the set of diffraction orders obtained from a mask, which is referred to as a wavefront, is directly optimized, permitting this approach to efficiently gauge the true degrees of freedom of the process, and thus to determine an optimal set of image-forming waves that can be propagated through a finite optical system to print a desired pattern.

The patent applications referenced above provide for various lithographic optimization techniques, by determining or calculating various manufacturing (i.e., manufacturability) penalties that can detract from the manufacturability of a lithographic mask. To determine the manufacturability of a lithographic, fast manufacturability computations are require, because a full mask optimization optimizes an area roughly ten million times times wider than is achieved in conventional mask optimization. For instance, if 10,000 processors are employed to perform optimization, the optimization area per processor is 1,000 times winder than is achieved in conventional mask optimization. However, existing approaches to determining lithographic mask manufacturability for optimization purposes can be slow.

The inventors have recognized, though, that optimization techniques do not always require consideration of each manufacturing (i.e., manufacturability) constraint in relation to the lithographic mask in question. Rather, the inventors have found that only critical manufacturing constraints contribute measurably to the decrease in the run-time optimization of a lithographic mask, without sacrificing the overall manufacturability of the lithographic mask in question. For instance, such critical constraints include a shape penalty corresponding a large jog in a polygon, a gap penalty corresponding to a narrow gap between adjacent polygons, and a crossing penalty corresponding to overlapping polygons or a polygon having overlapping regions. Disclosed herein, therefore, are optimization techniques that provide for much faster lithographic mask optimization (in terms of mask manufacturability) as compared to existing such techniques.

FIGS. 1A and 1B show a method 100, according to an embodiment of the invention. At least some parts of the method 100 can be performed by a processor of a computing device. For instance, a computer program that implements these parts of the method 100 may be stored on a computer-readable data storage medium. Execution of the computer program by a processor causes performance of the parts of the method 100 that the program implements.

Mask layout data of a lithographic mask is received (102). The lithographic mask is employed in fabricating instances of a semiconductor device. The mask layout data includes polygons. Each polygon has a number of edges, including horizontal edges and vertical edges. What are referred to herein as target edge pairs, as described in more detail later in the detailed description, are each defined as follows. First, a target edge pair can include two of the horizontal edges of one or more of the polygons. Second, a target edge pair can include a horizontal edge of one polygon and a vertical edge of the same or different polygon. Third, a target edge pair can include two of the vertical edges of one or more of the polygons. The following discussion is exemplarily made in relation to two horizontal edges, however.

It is noted that an edge pair that is found in a search box necessarily has a non-zero manufacturability penalty value. The corresponding manufacturability constraint is specified as c(x), which is equal to a tolerance cutoff value minus the non-zero manufacturability penalty value. If c(x) is negative, then a manufacturability condition has been violated.

As such, not all edge pairs within a search box violate a manufacturability condition. Particularly, those edge pairs for which c(x) is positive, even if they have non-zero manufacturability penalty values, are not in violation. It is noted in this respect that the search box is used to locate edge pairs that have non-zero manufacturability penalty values. Depending on the corresponding tolerance cutoff values, these edge pairs may or may not be in violation.

To locate the target edge pairs, a search box, such as a rectangular search box, is specified over the mask layout data a number of times. The search box has a predetermined size that is smaller than the corresponding layout of the mask layout data of the lithographic mask. The search box is specified as having a horizontal boundary, either the lower horizontal boundary or the upper horizontal boundary, that is coincident with a given horizontal edge within the mask layout data (104).

The purpose of the search box is to limit the search area for edge pairs that affect manufacturability. That is, edge pairs that are outside the search box (i.e., one edge is inside the search box, and the other edge is outside the search box) are automatically and/or implicitly assigned a manufacturability penalty value of zero. Employing a search box thus dramatically reduces the number of manufacturability constraints that have to be considered when determining the manufacturability penalty value.

It is thus determined whether the search box includes at least one additional horizontal edge besides the given horizontal edge that is coincident with the horizontal boundary of the search box (106). For each such additional horizontal edge within the search box, a corresponding target edge pair is specified (108). Specifically, each corresponding target edge pair includes the given horizontal edge, and one of the additional horizontal edges within the search box. These corresponding target edge pairs will be used to perform proximity checking of the mask layout data. One manner by which target edge pairs can be located within the search box is to employ a quad tree approach.

If the search box can again be specified (i.e., moved) within the mask layout data such that it does not include any target edge pair that has already been specified, then the method 100 is repeated at part 104. In a typical scenario, then, the search box is specified a number of times. Each time the search box is specified, a number of target edge pairs are defined. Importantly, however, the same target edge pair is not defined within more than one search box. That is, the target edge pairs are not duplicated among the search boxes. This asymmetrical approach to locate target edge pairs—by using a search box that can be considered an asymmetrical search box—provides for fast identification of the target edge pairs. The asymmetrical search box approach also reduces the discovery or location of duplicate target edge pairs.

FIG. 2 shows example mask layout data 200 in relation to which performance of parts 104, 106, 108, and 110 is illustratively depicted, according to an embodiment of the invention. The mask layout data 200 includes a number of polygons, such as the polygon 202. The polygon 202 includes three horizontal edges 204A, 204B, and 204C, which are collectively referred to as the horizontal edges 204.

Two exemplary search boxes 206A and 206B, collectively referred to as the search boxes 206, are depicted in FIG. 2. The search box 206A has a horizontal boundary coincident with the horizontal edge 204A, and also includes the horizontal edge 204B. As such, a first target edge pair including the horizontal edges 204A and 204B is defined in relation to the search box 206A. The search box 206B has a horizontal boundary coincident with the horizontal edge 204B, and also includes the horizontal edge 204C, such that a second target edge pair including the horizontal edges 204B and 20C is defined in relation to the search box 206B.

Assume that the search box 206A was specified first, and then the search box 206B was specified. When the search box 206B is specified, it cannot include the first target edge pair, because this target edge pair has already been defined. For instance, the search box 206B could not have been specified so that its upper horizontal boundary was coincident with the horizontal edge 204B, because such a specification would result in both the horizontal edges 204A and 204B being included in the search box 206B, and a target pair including these edges 204A and 204B has already been defined.

Referring back to FIG. 1A, once no more search boxes can be specified in relation to the mask layout data without including a target edge pair that has already been specified, then the method 100 proceeds to determine the manufacturability penalty value for each target edge pair (112). This determination is the process by which edges within the mask layout data are examined to determine whether they potentially violate a manufacturability condition, although they will incur a non-zero manufacturability penalty value. That is, a target edge pair that is located in a search box necessarily has a non-zero manufacturability penalty value.

Therefore, the manufacturability penalty determination is performed for such a target edge pair to determine its non-zero manufacturability penalty value, and also to determine whether the pair is in violation. However, edge pairs that are not located within a search box necessarily have a zero manufacturability penalty value, such that the manufacturability penalty determination is not performed for such edge pairs, because they are necessarily not in violation. The target edge pairs are not necessarily the only edges in relation to which proximity checking is performed. Rather, the target edge pairs can each be used as a starting point to determine whether any edges of the mask layout data violate any predetermined manufacturability condition, as is now described in more detail. It is noted that parts 102, 104, 106, 108, 110, and 112 of the method 100 can be considered as performing a proximity check process and a manufacturability penalty determination process.

FIG. 3 shows a method 300 that can be used to implement the determination of part 112 of the method 100. The method 300 is described in relation to a given target edge pair. The target edge pair in question includes two horizontal edges, including the horizontal edge that was coincident with a horizontal boundary of a particular search box that resulted in definition or specification of the target edge pair. This horizontal edge is referred to as the given horizontal edge of the target edge pair.

Manufacturability penalty determination is performed between the given horizontal edge of the target edge pair in question, and each other horizontal edge within the search box that was used to define the target edge pair (302). Manufacturability penalty determination in this respect involves determining the (vertical) distance between the given horizontal edge and each other horizontal edge within the search box, and comparing each such distance to a threshold. If any distance is less than the threshold, then it is said that the edge pair in question violates a manufacturability condition, or constraint. The manufacturability condition can result in a gap penalty or a shape penalty being assessed to the edge pair.

FIGS. 4A and 4B, for instance, shows an example of a gap manufacturability condition that is potentially being violated, and an example of a shape manufacturability condition that is potentially being violated, respectively, according to an embodiment of the invention. In FIG. 4A, the search box 400 includes two polygons 402 and 404. The polygon 402 includes the given horizontal edge 406, whereas the polygon 404 includes the horizontal edge 408. The distance between the horizontal edges 406 and 408 is less than a threshold. Because the horizontal edges 406 and 408 are part of different polygons 402 and 404, the resulting manufacturability condition may have violated is a gap manufacturability condition, and the edges 406 and 408 are assessed a gap manufacturability penalty (i.e., a non-zero manufacturability penalty value). It is noted in this respect the finding an edge pair within a search box does not necessarily mean that the edge pair is in violation. However, it is certain that the edge pair has a non-zero manufacturability penalty value.

In FIG. 4B, the search box 420 includes one polygon 422. The polygon 422 includes the given horizontal edge 424, as well as another horizontal edge 426 within the search box 420. The distance between the horizontal edges 424 and 426 is less than a threshold. Because the horizontal edges 424 and 426 are part of the same polygon 422, the resulting manufacturability condition may have violated is a shape manufacturability condition, and the edges 424 and 426 are assessed a shape manufacturability penalty (i.e., a non-zero manufacturability penalty value). It is noted in this respect that, as in FIG. 4A, finding an edge pair within a search box does not necessarily mean that the edge pair is in violation, but rather only that the edge pair has a non-zero manufacturability penalty value.

Referring back to FIG. 3, manufacturability penalty determination is also performed between a given horizontal edge of the target edge pair in question and each vertical edge within the search box, or conversely, between a given vertical edge of the target edge pair in question and each horizontal edge within the search box (304). Such penalty determination in this respect involves determining the distance between each pair of two such edges. If any distance is less than the threshold, then it is said that the edge pair in question may violate a manufacturability condition, but is assessed a non-zero manufacturability penalty value that specifically relates to a crossing penalty.

FIGS. 5A and 5B, for instance, show an example of a gap manufacturability condition that may potentially be violated, and an example of a shape manufacturability condition that may potentially be violated, respectively, according to an embodiment of the invention. In FIG. 5A, the search box 400 as in FIG. 4A includes two polygons 402 and 404. The polygon 402 includes the given horizontal edge 406, which shares an endpoint with a given vertical edge 502. The polygon 404 includes a vertical edge 504. The distance between the vertical edges 502 and 504 is less than a threshold. Because the vertical edges 502 and 504 are part of different polygons 402 and 404, a manufacturability condition may have been violated. However, at the very least, the edges 502 and 504 are assessed a non-zero manufacturability penalty value.

In FIG. 5B, the search box 420 as in FIG. 4B includes one polygon 422. The polygon 422 includes the given horizontal edge 424, which shares an endpoint with a given vertical edge 522. The polygon 422 also includes a vertical edge 524. The distance between the vertical edges 522 and 524 is less than a threshold. Because the vertical edges 522 and 524 are part of the same polygon 422, a manufacturability condition may have been violated. However, at the very least, the edges 522 and 524 are assessed a non-zero manufacturability penalty value.

Referring back to FIG. 1A, once manufacturability penalties have been determined (112), a dynamic manufacturability constraint table and a non-zero multiplier table are maintained, or managed (114). These two tables can be maintained and managed as a single integrated table, or as two distinct tables. It is noted that the result of part 112 can be the identification of a collection of one or more edge pairs that may potentially violate manufacturability constraints, and that have non-zero manufacturability penalty values. These edge pairs are identified by the processes that have been described, based on the identification of target edge pairs in parts 104-110. It is noted that when an edge pair is found in a search box, the edge pair information and a manufacturability constraint value is thus added to the constraint table. This constraint value is c(x), and is equal to a tolerance cutoff value minus the non-zero manufacturability penalty value assessed to the edge pair.

The dynamic manufacturability constraint table is managed in part 114 so that the first time an edge pair potentially violates a manufacturability constraint (i.e., has a non-zero manufacturability penalty value), the edge pair is added to the table. After the lithographic mask has been optimized, however, the edge pair may no longer potentially violate a constraint (i.e., no longer have a non-zero manufacturability penalty value). Nevertheless, the edge pair may still be relevant to performing subsequent iterations of lithographic mask optimization, and therefore the edge pair still has to be tracked, even though it no longer potentially violates any constraint (i.e., no longer have a non-zero manufacturability penalty value).

FIG. 1B shows a method 150 for managing a dynamic manufacturability constraint table in part 114, according to such an embodiment of the invention. If the method 150 has been previously performed, the table already has one or more entries corresponding to target edge pairs that potentially violate manufacturability constraints (i.e., have non-zero manufacturability penalty values). Each such entry is set to the tolerance cutoff value (152).

The constraint value for a target edge pair is equal to the tolerance cutoff value minus the non-zero manufacturability penalty value for the target edge pair. A target edge pair that no longer has a non-zero manufacturability penalty value is still retained in the table (i.e., it is not removed from the table), but has a constraint value that is simply equal to the tolerance cutoff value, via performance of part 152. Therefore, in part 152, what is accomplished is that each entry within the table is reset to the tolerance cutoff value, which means that the constraint value for each target edge pair within the table is set to the tolerance cutoff value. In subsequent parts of the method 150, any target edge pair that still has a non-zero manufacturability penalty value has its constraint value adjusted to accommodate this non-zero manufacturability penalty value.

It is noted that the result of the method 100 from part 104 to part 112 is a collection of one or more edge pairs that may violate manufacturability constraints. This results from the identification of target edge pairs in subsequent performances of part 108, and the determination of non-zero manufacturability penalty values for one or more such edge pairs in part 112. That is, the collection of edge pairs that potentially violate manufacturability constraints is a set of edge pairs that have been identified in part 112 as having non-zero manufacturability penalty values, where this identification is made based on the target edge pairs identified in part 108.

What is referred to herein as a current edge pair is thus set to a first edge pair of this collection (154). If the current edge pair has an entry in the table (156), then the entry is updated to take into account the non-zero value that the current edge pair has for a manufacturability penalty (158). That is, because the constraint value is equal to the tolerance cutoff value minus the manufacturability penalty value, the constraint value is updated to take into account the fact that the manufacturability penalty value is still non-zero. Prior to performance of part 158, the entry for this current edge pair in the table was set to the tolerance cutoff value in part 152, which meant that the constraint value was simply set equal to the tolerance cutoff value. However, part 158 properly updates the constraint value in this respect to take into account that the current edge pair still has a non-zero manufacturability penalty value.

If the current edge pair does not have an entry in the table (156), then a new entry is created in the table for this edge pair that takes into account the non-zero value that the current edge pair has for a manufacturability penalty (160). As such, the constraint value for the current edge pair is set equal to the tolerance cutoff value used in part 152, minus the manufacturability penalty value for this current edge pair. Finally, if the current edge pair is not the last edge pair within the collection (162), then the method 150 advances the current edge pair to be the next edge pair within the collection (164), and the method is repeated at part 156. Otherwise, the method 150 is finished (166).

The effect of the method 150 is to maintain entries for edge pairs that once potentially violated constraints but that no longer do (i.e., no longer have non-zero manufacturability penalty values). When an entry for an edge pair is added to the table, the constraint value is set to the tolerance cutoff value minus the manufacturability penalty value. Each time the method 150 is performed again, this entry is initially reset so that the constraint value is simply equal to the tolerance cutoff value. If the edge pair is found in the search box, it still has a non-zero manufacturability penalty value, such that the constraint value is set equal to the tolerance cutoff value minus the non-zero manufacturability penalty value in part 158. However, if the edge pair no longer is in potential violation (i.e., it no longer has a non-zero manufacturability penalty value), then the constraint value remains equal to the tolerance cutoff value that was set in part 152.

In one embodiment, as noted above, the non-zero multiplier table can be managed as part of the same table as the dynamic manufacturability constraint table. In this embodiment, a flag, such as a bit, is set to each existing entry within the table in part 152. Thereafter, if the current edge pair was still found in the proximity check, then as part of updating the entry for the current edge pair in part 158, the flag is cleared to indicate that this edge pair still has a non-zero multiplier. When an entry is added to the table for a new edge pair in part 160, the flag is not set, and the non-zero multiplier for the edge pair is added as part of the table.

In part 166, for each entry for which the flag remains set, a special evaluation is performed. This is because any entry still having a set flag when the method 150 reaches part 166 corresponds to a target edge pair that was not located in the proximity check. The flags thus indicate entries that used to have non-zero multipliers. The special evaluation can entail, for instance, that a constant contribution, as appropriate, is made to an augmented Lagrangian during lithographic mask optimization.

It is noted that the multiplier for an edge pair can be the multiplier that is used when determining an augmented Lagrangian or its gradient, during lithographic mask optimization. An edge pair that no longer potentially violates a manufacturability constraint no longer has a non-zero multiplier. However, the edge pair may still be relevant, which is why the special evaluation is performed. After the special evaluation is performed, if the edge pair is deemed to still be relevant, then it is used during the optimization process, and otherwise is not.

In another embodiment, as also noted above, the non-zero multiplier table can be managed as a table that is different than the dynamic manufacturability table. FIG. 1C shows a method 180 for managing such a separate non-zero multiplier table, according to an embodiment of the invention. The table is specifically managed as a list in the embodiment of FIG. 1C.

A list of edge pairs that each had non-zero multipliers prior to the proximity check being performed is prepared (182). For instance, the list of edge pairs may be those edge pairs that are located in the dynamic manufacturability constraint table prior to the most recent performance of the method 150 of FIG. 1B. For example, this list may be created in part 182 prior to the method 150 being performed for a given iteration of part 114 of FIG. 1A.

What is referred to herein as a current edge pair is set to the first edge pair located during the proximity check in the method 100 of FIG. 1A (184). Note that unlike the set of edge pairs used in parts 154 and 164 of the method 150 of FIG. 1B, the set of edge pairs used in part 184 (and in part 192) is the set of all edge pairs located during the proximity check. By comparison, the set of edge pairs used in parts 154 and 164 of the method 150 is the set of all edge pairs that were located during the proximity check and that potentially violated a manufacturability condition (i.e., that have non-zero manufacturability penalty values).

If the current edge pair is located in the list (186), then the entry corresponding to this edge pair is removed from the list (188). From part 188, or if the current edge pair is not located in the list (186), then it is determined if the current edge pair is the last edge pair of the set of edge pairs referenced above (190). If not, then the current edge pair is advanced to the next edge pair in this set (192), and the method 180 is repeated at part 186. If yes, then the method 180 is finished (194), and any edge pairs that remain in the list can be subjected to a special evaluation, as described above.

Referring back to FIG. 1A, after the dynamic manufacturability constraint table and the non-zero multiplier table have been managed (114), an optimization process is performed in relation to the lithographic mask (116). The optimization process is performed based in particular on, or by specifically taking into primary account, the edge pairs within the two tables. For instance, the optimization process may be performed as is described in detail in the related patent applications referenced above, and which have been incorporated herein by such reference.

If further optimization is needed or desired (118), then the method 100 is repeated at part 104. Otherwise, the method 100 is finished (120). Whether further optimization is needed or desired can be specified as to the satisfaction of a particular condition, or based upon user approval or determination. As one example, if there are any edge pairs that still potentially violate manufacturability constraints (i.e., that have non-zero manufacturability penalty values), then it may be determined that further optimization is needed.

The techniques that have been described herein have been proven to provide for faster optimization of a lithographic mask. For instance, conventionally, the time needed to determine manufacturability was shown to take more than ten seconds using a given set of hardware. By comparison, using an embodiment of the invention, the time needed to determine manufacturability was shown to take just over one-tenth of a second using the same set of hardware, or about a one-hundred-fold improvement.

Figure 6:
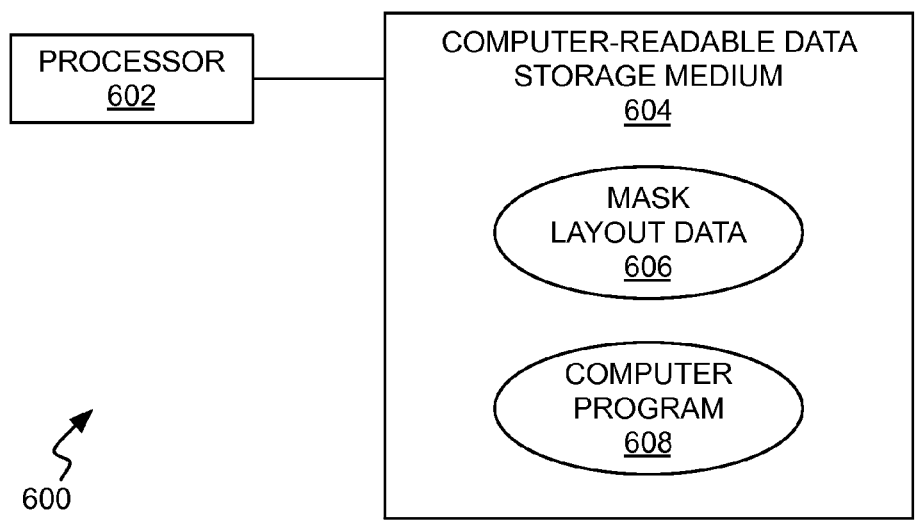
FIG. 6 is a diagram of a system, according to an embodiment of the invention.

In conclusion, FIG. 6 shows a rudimentary system 600, according to an embodiment of the invention. The system 600 can be implemented as one or more computing devices. The system 600 includes at least a processor 602 and a computer-readable data storage medium 604. The computer-readable data storage medium 604 stores mask layout data 606 for a photolithographic mask to be manufactured, as well as a computer program 608. Execution of the computer program 608 by the processor 602 from the computer-readable data storage medium 604 results in performance of the method 100 that has been described above.

It is noted that the present disclosure lends itself to different adaptations to even further improve performance. For instance, as has been described, a search box is specified that is asymmetric, in that a boundary of the search box is coincident with a horizontal edge or a vertical edge of the polygons. Such an asymmetric search box prevents double counting of the same edge pair.

However, two search boxes may be required: one search box for horizontal edges, and one search box for vertical edges. This is relatively inefficient in performance. This is because having two search boxes means that the processing performed to achieve proximity checking is effectively doubled.

In another embodiment, though, a single search box is used. The following description is made with reference to a search box that is specified, or defined, in relation to a horizontal edge being coincident with a boundary of the box, but the same approach is equally applicable to the search box being specified in relation to a vertical edge that is coincident with a boundary of the box. The horizontal edges are processed as before. That is, a target edge pair is defined for each pair of horizontal edges of the polygons that are located within the search box, where one of these horizontal edges is the horizontal edge with which the boundary of the search box is coincident.

To process the vertical edges, a given vertical edge that is directly connected to (i.e., shares a corner with) the horizontal edge with which the boundary of the search box is coincident is specified. This given vertical edge is at least partially within the search box, but may not be completely within the search box. Thereafter, target vertical edge pairs are defined. Specifically, each pair of vertical edge pairs that are at least partially—but not necessarily completely—located within the search box is considered a target vertical edge pair, where one vertical edge of each pair is the given vertical edge in question.

Furthermore, horizontal-vertical edge target edge pairs can be defined as well. Each such target edge pair includes either the horizontal edge with which the boundary of the search is coincident or the given vertical edge that is directly connected to this horizontal edge. In the former case, the other edge is a vertical edge that is at least partially within the search box. In the latter case, the other edge is a horizontal edge that is within the search box.

This embodiment of the invention thus provides for more efficient edge processing. Rather than having to specify two search boxes—one for horizontal edges and one for vertical edges—just a single search box is specified. Where a boundary of the search box is coincident with a horizontal edge, then the vertical target edge pairs are defined in relation to a vertical edge that shares a corner with this horizontal edge. Where a boundary of the search box is coincident with a vertical edge, then the horizontal target edge pairs are defined in relation to a horizontal edge that shares a corner with this vertical edge. In this way, processing of both horizontal edges and vertical edges can be achieved at basically the same time, without having to specify multiple search boxes.

It is finally noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wired, optical fiber cable, RF, and so on, or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   receiving, by a processor, mask layout data of a lithographic mask, the lithographic mask employed in fabricating instances of a semiconductor device, the mask layout data comprising a plurality of polygons, each polygon having a plurality of edges including a plurality of horizontal edges and a plurality of vertical edges, each target edge pair of a plurality of target edge pairs defined by two edges of one or more of the polygons;
   as an entry point of the method, specifying, by the processor, a search box having a boundary coincident with a given edge of the edges of the polygons in that a portion of the boundary overlaps a portion of the given edge;
   determining, by the processor, whether the search box includes at least one edge of the edges of the polygons in addition to the given edge;
   where the search box includes the at least one edge, specifying, by the processor, at least one of the target edge pairs, each target edge pair specified including the given edge and one of the at least one edge;
   where the search box can again be specified such that the boundary thereof is coincident with a different edge of the edges of the polygons, repeating the method at the entry point using the different edge as the given edge;
   where the search box does not include the at least one edge but at least one of the target edge pairs has been specified, or where the search box cannot again be specified, performing one or more subsequent actions; and
   where the search box does not include the at least one edge and the at least one of the target edge pairs has not been specified, terminating the method.

2. The method of claim 1, wherein the search box is a rectangular box.

3. The method of claim 1, wherein performing the one or more subsequent actions comprises:
   for each target edge pair that has been specified, determining a manufacturability penalty value, by the processor, for the target edge pair;
   maintaining a dynamic manufacturability constraint table and a non-zero multiplier table, by the processor;
   performing an optimization process in relation to the lithographic mask; and,
   where further optimization is desired, needed, or requested, repeating the method at the entry point.

4. The method of claim 3, wherein maintaining the dynamic manufacturability constraint table and maintaining the non-zero multiplier table comprises:
   where the dynamic manufacturability constraint table comprises one or more existing entries, setting a tolerance cutoff value to each existing entry;
   for each edge pair located during proximity checking and that potentially violates a manufacturability constraint,
      where one of the existing entries corresponds to the edge pair, updating the one of the existing entries to take into account a non-zero value; and,
      where no existing entry corresponds to the edge pair, creating a new entry within the dynamic manufacturability constraint table that takes into account the non-zero value.

5. The method of claim 4, wherein the dynamic manufacturability constraint table and the non-zero multiplier table are maintained as a single integrated table.

6. The method of claim 3, wherein maintaining the dynamic manufacturability constraint table and maintaining the non-zero multiplier table comprises
   setting up a list of edge pairs having non-zero multipliers;
   for each edge pair located during proximity checking and that potentially violates a manufacturability constraint, wherein the edge pair is located within the list, removing an entry from the list corresponding to the edge pair.

7. The method of claim 6, wherein the dynamic manufacturability constraint table and the non-zero multiplier table are maintained as two separate tables.

8. The method of claim 1, wherein determining whether the search box includes at least one edge of the edges of the polygons in addition to the given edge comprises processing the horizontal edges and the vertical edges of the polygons in relation to the search box such that the horizontal and the vertical edges of the polygons can be processed without having to specify another search box and another given edge.

9. The method of claim 8, wherein:
   where the given edge is a horizontal edge, the vertical edges of the polygons are processed in relation to a particular vertical edge that is connected to the given edge regardless of whether the vertical edges and the particular vertical edge are each completely within the search box, and
   where the given edge is a vertical edge, the horizontal edges of the polygons are processed in relation to a particular horizontal edge that is connected to the given edge regardless of whether the horizontal edges and the particular horizontal edge are each completely within the search box.

10. A storage device having a computer program stored thereon, where execution of the computer program by a processor causes a method to be performed, the method comprising:
   receiving mask layout data of a lithographic mask, the lithographic mask employed in fabricating instances of a semiconductor device, the mask layout data comprising a plurality of polygons, each polygon having a plurality of edges including a plurality of horizontal edges and a plurality of vertical edges, each target edge pair of a plurality of target edge pairs defined by two edges of one or more of the polygons;

as an entry point of the method, specifying a search box having a boundary coincident with a given edge of the edges of the polygons in that a portion of the boundary overlaps a portion of the given edge;

determining whether the search box includes at least one edge of the edges of the polygons in addition to the given edge;

where the search box includes the at least one edge,
specifying at least one of the target edge pairs, each target edge pair specified including the given edge and one of the at least one edge;

where the search box can again be specified such that the boundary thereof is coincident with a different edge of the edges of the polygons, repeating the method at the entry point using the different edge as the given edge;

where the search box does not include the at least one edge but at least one of the target edge pairs has been specified, or where the search box cannot again be specified, performing one or more subsequent actions; and where the search box does not include the at least one edge and the at least one of the target edge pairs has not been specified, terminating the method.

11. The storage device of claim 10, wherein the search box is a rectangular box.

12. The storage device of claim 10, wherein performing the one or more subsequent actions comprises:
for each target edge pair that has been specified, determining a manufacturability penalty value for the target edge pair;
maintaining a dynamic manufacturability constraint table and a non-zero multiplier table;
performing an optimization process in relation to the lithographic mask; and,
where further optimization is desired, needed, or requested, repeating the method at the entry point.

13. The storage device of claim 12, wherein maintaining the dynamic manufacturability constraint table and maintaining the non-zero multiplier table comprises:
where the dynamic manufacturability constraint table comprises one or more existing entries, setting a tolerance cutoff value to each existing entry;
for each edge pair located during proximity checking and that potentially violates a manufacturability constraint,
where one of the existing entries corresponds to the edge pair, updating the one of the existing entries to take into account a non-zero value; and,
where no existing entry corresponds to the edge pair, creating a new entry within the dynamic manufacturability constraint table that takes into account the non-zero value.

14. The storage device of claim 13, wherein the dynamic manufacturability constraint table and the non-zero multiplier table are maintained as a single integrated table.

15. The storage device of claim 12, wherein maintaining the dynamic manufacturability constraint table and maintaining the non-zero multiplier table comprises
setting up a list of edge pairs having non-zero multipliers;
for each edge pair located during proximity checking and that potentially violates a manufacturability constraint, wherein the edge pair is located within the list, removing an entry from the list corresponding to the edge pair.

16. A system comprising:
a processor;
a storage device to store mask layout data of a lithographic mask, the lithographic mask employed in fabricating instances of a semiconductor device, the mask layout data comprising a plurality of polygons, each polygon having a plurality of edges including a plurality of horizontal edges and a plurality of vertical edges, each target edge pair of a plurality of target edge pairs defined by two edges of one or more of the polygons;
a computer program stored on the storage device and executed by the processor to specify a search box having a boundary coincident with a given edge of the edges of the polygons in that a portion of the boundary overlaps a portion of the given edge, to specify at least one of the target edge pairs as including the given edge and at least one edge of the edges of the polygons included in the search box.

17. The system of claim 16, wherein the computer program is further to:
for each target edge pair that has been specified, determine a manufacturability penalty value for the target edge pair; and,
maintain a dynamic manufacturability constraint table and a non-zero multiplier table.

18. The system of claim 17, wherein the computer program is to maintain the dynamic manufacturability constraint table and the non-zero multiplier table by:
where the dynamic manufacturability constraint table comprises one or more existing entries, setting a tolerance cutoff value to each existing entry;
for each edge pair located during proximity checking and that potentially violates a manufacturability constraint,
where one of the existing entries corresponds to the edge pair, updating the one of the existing entries to take into account a non-zero value; and,
where no existing entry corresponds to the edge pair, creating a new entry within the dynamic manufacturability constraint table that takes into account the non-zero value.

19. The system of claim 18, wherein the dynamic manufacturability constraint table and the non-zero multiplier table are maintained as a single integrated table.

20. The system of claim 17, wherein the computer program is to maintain the dynamic manufacturability constraint table and the non-zero multiplier table by:
setting up a list of edge pairs having non-zero multipliers;
for each edge pair located during proximity checking and that potentially violates a manufacturability constraint, wherein the edge pair is located within the list, removing an entry from the list corresponding to the edge pair.

* * * * *